United States Patent [19]

Lang

[11] Patent Number: 5,350,632
[45] Date of Patent: Sep. 27, 1994

[54] IMPREGNATED, DIMENSION-STABLE POLYESTER CORD

[75] Inventor: Bruno Lang, Ballwil, Switzerland

[73] Assignee: Rhone-Poulenc Viscosuisse S.A., Emmenbruecke, Switzerland

[21] Appl. No.: 17,632

[22] Filed: Feb. 12, 1993

Related U.S. Application Data

[60] Continuation-in-part of Ser. No. 710,051, Jun. 4, 1991, abandoned, which is a continuation-in-part of Ser. No. 392,137, Aug. 19, 1989, abandoned, which is a division of Ser. No. 259,510, Oct. 14, 1988, Pat. No. 4,883,629, which is a continuation of Ser. No. 870,311, Jun. 3, 1986, abandoned.

[30] Foreign Application Priority Data

Jun. 19, 1985 [CH] Switzerland ............... 2597/85

[51] Int. Cl.$^5$ ............ C08G 63/18; D01F 6/62; B32B 25/00
[52] U.S. Cl. .................... 428/382; 428/364; 428/365; 428/375; 428/377; 428/392; 428/395; 428/926; 528/301; 528/308.2; 264/103; 57/258; 57/237; 57/241; 57/902
[58] Field of Search ............ 428/364, 373, 375, 378, 428/395, 377, 382, 392; 528/301, 308, 308.2, 309; 57/258, 237, 281, 902

[56] References Cited

U.S. PATENT DOCUMENTS 4,101,525 10/1976 Davis et al. ............... 528/308.2

FOREIGN PATENT DOCUMENTS 1261337 1/1972 United Kingdom .

*Primary Examiner*—Patrick J. Ryan
*Assistant Examiner*—Richard P. Weisberger
*Attorney, Agent, or Firm*—Michael J. Striker

[57] ABSTRACT

The dimension-stable impregnated polyester tire cord is at least 95% by weight polyethylene terephthalate and has an intrinsic viscosity of 0.70 dl/g to 0.89 dl/g for undrawn cord, a fineness of at least 1100 x 2 dtex, a dimension stability coefficient of at least 30'000 cN$^2$/tex$^2$, a thermal shrinkage of about 0.8 percent measured at a temperature of 160° C. with 0.1 cN/tex pre-stress and a permanent lengthening of less than 1.5 percent at a tire pressure of 2 bar and a temperature of 100° C., so as to reduce shrinkage during vulcanization and in tires heated in operation and so as to provide a quieter running tire. The fatigue resistance of this polyester tire cord suffers a drop in tensile strength of less than 20 percent measured at 10.8 MC with 6 percent strain and 6 percent compression so that tires made from the polyester cord have a greater durability and increased life.

14 Claims, No Drawings

IMPREGNATED, DIMENSION-STABLE POLYESTER CORD

BACKGROUND OF THE INVENTION

This application is a continuation-in-part application of application Ser. No. 710,051, filed Jun. 4, 1991, abandoned, which, in turn, is a continuation-in-part of application Ser. No. 392,137, filed Aug. 10, 1989, abandoned, which, in turn, is a divisional application of application Set. No.259,510, filed Oct. 14, 1988, now U.S. Pat. No. 4,883,620 which, in turn, is a continuation of application Ser. No. 870,311, filed Jun. 3, 1986, abandoned.

The present invention relates to an impregnated, dimension-stable polyester tire cord.

Polyester tire cord is currently at least 95 percent by weight polyethylene terephthalate and has a viscosity of more than 0.70 dl/g and a titer of at least 1100×2 dtex. This polyester tire cord is made by a two-step heat treatment including hot stretching and hot relaxation. The hot stretching is generally performed at a higher temperature than the hot relaxation.

Motor vehicle tires of typical construction are composed in their essential parts of a stability support in the form of the tire cord, which is vulcanized into rubber. The external shape and, in particular, the tread, i.e. the contact surface, is determined by a rubber mixture of a certain specific composition. So that these tires have good operating characteristics and a long useful life, two significant conditions, among others, must be fulfilled: the tires must be very uniform in their external shape and, accordingly, remain dimension-stable, indeed upon production as well as in later use, and under all conditions under which the vehicle on which they are mounted is driven, especially high acceleration conditions.

When dimension-stable products, e.g. metal wires, are employed as stability supports, the conditions are somewhat more easily attained through precise tire construction. However, when materials such as twine of high strength synthetic yarn is used, the objective of high dimension stability is obtained only to an unsatisfactory extent, since either during or directly after vulcanization, indeed depending on the pressing conditions, the rubber of the stability supports shrinks or lengthens, resulting in an inability to maintain the stability support under control.

Various methods are known for the two step heat treatment of polyester cords to yield treated polyester tire cord. For example, according to DE-AS 20 22 748, a polyester cord is stretched in a first step at least 8% at a temperature between 199° C. and 254° C. and relaxed at least seven percent in a second step at a temperature between 163° and 204° C. The resulting polyester cord displays at 160° C. a heat shrinkage not less than 5.8 percent Whether or not the strength characteristics of this type of cord are improved, the relative high heat shrinkage is characteristic of an unsatisfactory dimension-stability in the finished pneumatic tires.

The use of a polyester filament yarn based on at least 85 mole % polyethylene terephthalate in pneumatic tires is known from U.S. Pat. No. 4,101,525. Because of the described process in this reference, the characteristics of the yarn used for making tires are improved. The thermal shrinkage of this yarn is between 7.8 and 5.0 percent and is significantly improved over previous yarn which had a shrinkage of 10 percent. Although the polyester filament yarn having a pre-thermal shrinkage of about 5 percent is sufficient for many applications, it is frequently not suitable to meet the requirements of pneumatic tires of higher required ratings which require a high dimension stability.

This type of polyester cord described in U.S. Pat. No. 4,101,525 which has a thermal shrinkage of more than 5% is still not dimension-stable. This is true for polyester cord with more than 5% shrinkage which has the high thermal shrinkage during the beginning of the tire formation process or which acquires the high thermal shrinkage in the course of production of the tires, directly after vulcanization during the so-called post-cure inflation when the hot tires are subjected to high pressure. During use the polyester cord length in tires made with this type of cord changes as the tire is used, which leads to nonquiet operation of the tires.

SUMMARY OF THE INVENTION

It is an object of the present invention to provide dimension-stable impregnated polyester tire cord which has a dimension-stability coefficient of at least 30'000 cN$^2$/tex$^2$, a thermal shrinkage of not more than about 0.8 percent measured at a temperature of 160° C. with 0.1 cN/tex pre-stress and a permanent lengthening of less than 1.5 percent at a tire pressure of 2 bar and a temperature of 100° C., so as to reduce shrinkage during vulcanization and in hot tires compared to currently available tire cord and to provide a quieter running tire compared to currently available tires.

It is also an object of the present invention to provide a dimension-stable impregnated polyester tire cord which has a smaller thermal shrinkage than current polyester tire cord during and after vulcanization and a higher dimension stability coefficient and higher fatigue resistance as well as a satisfactory initial modulus.

According to the present invention, the impregnated, dimension-stable polyester tire cord of the invention is made from at least 95% by weight polyethylene terephthalate by a method to be described in more detail below. This improved impregnated, dimension-stable polyester cord is characterized by an intrinsic viscosity of 0.70 dl/g to 0.89 dl/g for undrawn cord, a fineness of at least 1100×2 dtex, a thermal shrinkage of not more than 0.8 percent measured at a temperature of 160° C. with 0.1 cN/tex pre-stress, a permanent lengthening of less than 1.5 percent at a tire pressure of 2 bar and a temperature of 100° C. and a dimension stability coefficient of at least 30'000 cN$^2$/tex$^2$.

Polyester tire cord according to the invention has been prepared in various embodiments with dimension stability coefficients between about 30'000 and 46'000 cN$^2$/tex$^2$. The other properties including thermal shrinkage, fineness and permanent lengthening are in the ranges described above in these embodiments. Tire cord according to the invention with a dimension stability coefficient of 46'000 cN$^2$/tex$^2$ and a thermal shrinkage of 0.6% at 160° C. has been prepared, but is not technically useful.

Estimates of the dimension stability of the tire cord of U.S. Pat. No. 4,690,866 issued to S.Kumakawa et al indicate that the tire cord described in this reference has a dimension stability coefficient of about 25'000 cN$^2$/tex$^2$, although precise comparisons are not possible, because the terminal modulus, and not the initial modulus, is reported in Kumakawa.

In a preferred embodiment of the invention, the thermal shrinkage is about 0.8 percent measured at a temperature of 160° C. with 0.1 cN/tex pre-stress.

The polyester tire cord of the invention has a shrinkage force of less than 0.7 cN/tex, a fatigue resistance such that the polyester tire cord suffers a drop in tensile strength of less than 20 percent measured at 10.8 MC with 6 percent strain and 6 percent compression so that the tires made from the polyester cord have a longer life in comparison to conventional tires.

Additionally the improved impregnated polyester tire cord displays a tension of greater than 6.8 cN/tex upon 1.5 percent strain and greater than 12 cN/tex upon 5 percent strain. These ranges are above the typical operating ranges during practical employment of tire cords, and encourage a very good fatigue behavior conditioned upon the high stretching.

This polyester tire cord has the advantage of reduced shrinkage during vulcanization and in hot tires compared to currently available tire cord. Tires made from it are quieter running compared to currently available tires.

All shrinkage measurements described herein were made by the Standard ASTM Method D 2259-83 (ASTM Committee on Standards, 1916 Race Street, Philadelphia, Penna., 19103), in which a length change of a skein of yarn under a specific load, which is sufficient to straighten, but not stretch, the yarn is measured, after exposure to heat at a certain temperature. Measurements were carried out at 160° C. with a five minute dwell time and loaded with a pre-stress weight of 0.1 cN/tex.

The impregnated polyester tire cord according to the invention is advantageously composed of at least 95 percent by weight polyethylene terephthalate and 5% or less of copolymers as described in DE-AS 2,022,748.

The cord is impregnated by any of a variety of known prior art methods. The impregnating material is advantageously an adhesive material which provides an improved adherence between the cord and rubber. These adhesive materials may be applied to the cord before or during the stretching operation and a curing agent can be applied simultaneously. The adhesive material can be an epoxy material or another adhesive material, e.g. based on isocyanates. The preferred impregnating material is resorcinol-formaldehyde latex adhesive.

The polyester tire cord of the invention is prepared from undrawn cord in a two-step method including a first hot stretching step followed by a hot relaxation in which the hot stretching occurs at a higher temperature than the relaxation. The first stretching step occurs at a temperature of from 220°-250° C., preferably at about 240° C., while the second relaxation step occurs at a temperature of from 190° to 250° C., preferably at about 210° C. In the first step, which is performed under high tension, the polyester cord is stretched at least 3 percent and at most 8 percent, preferably from 4 to 7 percent. In the second step, the stretched polyester tire cord relaxes at most 7 percent and at least 3 percent.

It has unexpectedly been discovered that, when relaxation temperatures above 205° C. are used, an improvement occurs in the dimension-stability of the tire cord product. A temperature range between 205° C. and 250° C. has proven particularly satisfactory for relaxation. Then cord, which has been relaxed, e.g. at 240° C., does not require a substantial cool down from the stretching zone.

By manufacturing tires with the tire cord according to the present invention, it is no longer necessary to forcibly pump up the still hot tires after vulcanization, to compensate by after-stretching, for too great a shrinkage (post-cure inflation) and thus to bring the tires to the correct dimensions. A disadvantage of this previous procedure (post-cure inflation) is that the specific stability support is uncontrolled, which can lead to irregular construction of the tires.

It is advantageous to select the stretching and relaxation stages so that on cord loadings of 1.5 percent extension, the tension is somewhat greater than 6.8 cN/tex, and on 5 percent extension, somewhat greater than 12 cN/tex. These ranges lie above the typical operating ranges during practical employment of tire cords, and encourage a very good fatigue behavior conditioned on the high stretching. The range from 0 to 6.8 cN/tex lying thereunder remains, based on the high initial modulus of polyester, extensively uneffected by the degree of relaxation, and thus guarantees high uniformity, stability and operational properties in the tires.

The best cord and cord fabric stabilities and fatigue resistances are obtained, when the polyester cord is exposed to a tension of about 5 cN/tex during the hot stretching and, during the subsequent relaxation, a tension of about 1.0 cN/tex.

The fatigue resistance measured at 10.8 MC (megacycles) by a Disc-Fatigue-Tester with 6 percent stretching and 6 percent compression, is 5 to 20 percent higher than conventionally-treated polyester cord which is worked up into PCI-treated tires. The result thereof is a considerably higher useful life of the tires.

EXAMPLES

Example 1

A polyester cord of LS-polyester, dtex 1100×2 with 470/470 tpm twine is dipped in a bath of about 20% by weight of a resorcinol-formaldehyde latex (RFL). It is then stretched during a period of 45 seconds and at a temperature of 240° C. about 7 percent and subsequently relaxed during a period of 50 seconds and at a temperature of 210° C. about 7 percent. The result is that with 1.5 percent stretching a tension of 7.2 cN/tex is observed and the thermal shrinkage at 160° C. is 0.8 percent with 88 cN shrinkage force. Other properties of this tire cord according to the invention are a strength of 566 cN/tex and an initial modulus of about 450 cN/tex.

EXAMPLE 2(COMPARATIVE)

A polyester cord of LS-polyester, dtex 1100×2 with 470/470 tpm twine is dipped in a bath of about 20% by weight of a resorcinol-formaldehyde latex (RFL). It is then stretched during a period of 45 seconds and at a temperature of 240° C. about 7 percent but subsequently is not relaxed, i.e. is relaxed during a period of 50 seconds and at a temperature of 210° C. about 0 percent. The result is that, with 1.5 percent stretching, a tension of 10.0 cN/tex is observed and the thermal shrinkage at 160° C. is 5.1 percent with 420 cN shrinkage force. Other properties of this tire cord are an approximate strength of 56 cN/tex and an initial modulus of about 450 cN/tex.

EXAMPLE 3(COMPARATIVE)

When the impregnated cord described in Example 1 is neither stretched nor relaxed, the results are known as the classical results. In the case of a 1.5 percent strain a tension of 20N or 7.6 cN/tex is observed and this prior art polyester cord has a thermal shrinkage at 160° C. of 2.2 percent with 220 cN shrinkage force. The tenacity is 56 cN/tex and the initial modulus is about 450 cN/tex.

The best dimension-stability, strength and fatigue-resistance for tire cord is attained according to the methods described above, when the cord fabrics are stretched as much as possible during impregnation and subsequently relaxed as much as possible.

The textile fabric prepared in this manner is particularly suitable for tires, conveyer belts, drive belts and hoses because of its rayon-like uniformity, dimension-stability and low hysteresis.

While the invention has been illustrated and embodied in an impregnated, dimension-stable polyester tire cord, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. Dimension-stable impregnated polyester tire cord comprising at least 95% by weight polyethylene terephthalate and having an intrinsic viscosity of 0.70 dl/g to 0.89 dl/g for undrawn cord, a fineness of at least 1100×2 dtex, a dimension stability coefficient of at least 30'000 cN$^2$/tex$^2$, a thermal shrinkage of about 0.8 percent measured at a temperature of 160° C. with 0.1 cN/tex pre-stress and a permanent lengthening of less than 1.5 percent at a tire pressure of 2 bar and a temperature of 100° C., so as to reduce shrinkage during vulcanization and in tires heated in operation and so as to provide a quieter running tire.

2. Dimension-stable impregnated polyester tire cord as defined in claim 1, further displaying on vulcanization a change in length of less than 1 percent and a shrinkage force of less than 0.7 cN/tex.

3. Dimension-stable impregnated polyester tire cord as defined in claim 1, further displaying a fatigue resistance such that said polyester tire cord suffers a drop in tensile strength of less than 20 percent measured at 10.8 MC with 6 percent strain and 6 percent compression so that said tires made from the polyester cord have a greater durability and increased life.

4. Dimension-stable impregnated polyester tire cord as defined in claim 1, further displaying a tension of greater than 6.8 cN/tex upon 1.5 percent strain and greater than 12 cN/tex upon 5 percent strain.

5. Dimension-stable impregnated polyester tire cord as defined in claim 1, wherein the dimension stability coefficient is from about 30'000 to 46'000 cN$^2$/tex$^2$.

6. Dimension-stable impregnated polyester cord comprising at least 95% by weight polyethylene terephthalate and having an intrinsic viscosity of 0.70 dl/g to 0.89 dl/g for undrawn cord, a fineness of at least 1100×2 dtex, a dimension stability coefficient of at least 30'000 cN$^2$/tex$^2$, a thermal shrinkage of about 0.8 percent measured at a temperature of 160° C. with 0.1 cN/tex pre-stress, a permanent lengthening of less than 1.5 percent at a tire pressure of 2 bar and a temperature of 100° C. and a fatigue resistance such that said polyester tire cord suffers a drop in tensile strength of less than 20 percent measured at 10.8 MC with 6 percent strain and 6 percent compression so that said tires made from the polyester cord have a greater durability and increased life and made by a process including the steps of stretching from 3 to 8 percent at a temperature of from 220°–250° C. and after the stretching and impregnating, relaxing the polyester cord from 3 to 7 percent at a temperature of from 190° to 250° C.

7. Dimension-stable impregnated polyester cord as defined in claim 6, wherein the polyester cord is stretched in the stretching from 4 to 7% at about 240° C.

8. Dimension-stable impregnated polyester cord as defined in claim 6, wherein the polyester cord is relaxed at about 210° C.

9. Dimension stable impregnated polyester cord as defined in claim 6, wherein the adhesive material comprises a resorcinol-formaldehyde latex.

10. Dimension stable impregnated polyester cord as defined in claim 9, wherein in said stretching said polyester cord is stretched at a temperature of 240° C. about 7 percent and in said relaxing said polyester cord is relaxed at a temperature of 210° C. about 7 percent, and said polyester tire cord has a strength of 56 cN/tex.

11. Dimension stable impregnated polyester cord as defined in claim 9, wherein in said stretching said polyester cord is stretched at a temperature of 240° C. about 7 percent and in said relaxing said polyester cord is relaxed at a temperature of 210° C. about 7 percent, and said polyester tire cord has an initial modulus of about 450 cN/tex.

12. Dimension stable impregnated polyester cord as defined in claim 9, wherein in said stretching said polyester cord is stretched at a temperature of 20° C. about 7 percent and in said relaxing said polyester cord is relaxed at a temperature of 210° C. about 7 percent, and said polyester tire cord has an initial modulus of about 450 cN/tex and a tensile strength of 56 cN/tex.

13. Dimension stable impregnated polyester cord as define din claim 1, wherein said polyester tire cord has a tensile strength of 56 cN/tex.

14. Dimension stable impregnated polyester cord as defined in claim 13, wherein said polyester tire cord has an initial modulus of about 450 cN/tex.

* * * * *